US012621458B2

(12) United States Patent
Zhao et al.

(10) Patent No.: US 12,621,458 B2
(45) Date of Patent: May 5, 2026

(54) SYSTEMS AND METHODS FOR CROSS-VIEW MOTION VECTOR PREDICTION

(71) Applicant: Tencent America LLC, Palo Alto, CA (US)

(72) Inventors: Xin Zhao, Palo Alto, CA (US); Han Gao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 50 days.

(21) Appl. No.: 18/657,708

(22) Filed: May 7, 2024

(65) Prior Publication Data

US 2025/0159186 A1 May 15, 2025

Related U.S. Application Data

(60) Provisional application No. 63/548,368, filed on Nov. 13, 2023.

(51) Int. Cl.
*H04N 7/12* (2006.01)
*H04N 19/105* (2014.01)
(Continued)

(52) U.S. Cl.
CPC ......... *H04N 19/137* (2014.11); *H04N 19/105* (2014.11); *H04N 19/172* (2014.11); *H04N 19/597* (2014.11)

(58) Field of Classification Search
CPC .. H04N 19/137; H04N 19/105; H04N 19/172; H04N 19/597; H04N 19/52
See application file for complete search history.

(56) References Cited

U.S. PATENT DOCUMENTS 11,146,818 B1 10/2021 Tian et al.
11,418,810 B2 8/2022 Tian et al.
(Continued)

FOREIGN PATENT DOCUMENTS

WO WO 2021034230 A2 2/2021

OTHER PUBLICATIONS

Tencent America LLC, ISRWO, PCT/US2024/029775, Aug. 7, 2024, 10 pgs.
(Continued)

*Primary Examiner* — Gims S Philippe
(74) *Attorney, Agent, or Firm* — Morgan, Lewis & Bockius LLP

(57) ABSTRACT

The various implementations described herein include methods and systems for coding video. In one aspect, a method includes receiving a multi-view video bitstream that includes a first block in a first frame corresponding to a first view and a second block in a second frame corresponding to a second view. The method identifies a first set of reference frames in the first view for the first block. The method obtains motion vectors corresponding to a second set of reference frames in the second view for the second block. In accordance with a determination that the first set of reference frames share a display time with the second set of reference frames, the method derives a motion vector predictor (MVP) for the first block corresponding to the first view using the set of motion vectors corresponding to the second view, and decodes the first block using the derived MVP.

18 Claims, 9 Drawing Sheets

Communication System 100

(51) Int. Cl.
H04N 19/137 (2014.01)
H04N 19/172 (2014.01)
H04N 19/597 (2014.01)

(56) References Cited

U.S. PATENT DOCUMENTS

| | | | |
|---|---|---|---|
| 2008/0117985 A1 | 5/2008 | Chen | |
| 2009/0185616 A1* | 7/2009 | Pandit | H04N 19/61 375/E7.026 |
| 2010/0046619 A1 | 2/2010 | Koo et al. | |
| 2011/0032980 A1 | 2/2011 | Gao et al. | |
| 2012/0213282 A1 | 8/2012 | Choi et al. | |
| 2012/0269269 A1* | 10/2012 | Choi | H04N 19/105 375/E7.123 |
| 2014/0016693 A1 | 1/2014 | Zhang | |
| 2014/0185686 A1* | 7/2014 | Wu | H04N 19/597 375/240.16 |
| 2014/0219346 A1 | 8/2014 | Ugur et al. | |
| 2015/0172714 A1 | 6/2015 | Wu et al. | |
| 2016/0134874 A1 | 5/2016 | Konieczny et al. | |
| 2016/0261876 A1 | 9/2016 | Nakagami | |
| 2016/0366415 A1 | 12/2016 | Liu et al. | |
| 2017/0164004 A1* | 6/2017 | Lee | H04N 19/62 |
| 2019/0297258 A1* | 9/2019 | Trevor | H04N 23/698 |
| 2020/0186794 A1 | 6/2020 | Chao et al. | |
| 2020/0404335 A1 | 12/2020 | Egilmez et al. | |
| 2021/0400258 A1 | 12/2021 | Li et al. | |
| 2023/0108814 A1 | 4/2023 | Skupin et al. | |
| 2023/0308682 A1 | 9/2023 | Jung et al. | |
| 2023/0328222 A1* | 10/2023 | Dahlquist | H04N 13/351 345/419 |
| 2025/0071252 A1* | 2/2025 | Fattal | H04N 13/194 |

OTHER PUBLICATIONS

Tencent America LLC, ISRWO, PCT/US2024/029776, Aug. 7, 2024, 9 pgs.

Tencent America LLC, ISRWO, PCT/US2024/029777, Sep. 19, 2024, 20 pgs.

Gerhard Tech et al., "Overview of the Multiview and 3D Extensions of High Efficiency Video Coding", IEEE Transactions on Circuits and Systems for Video Technology, vol. 26, Iss. 1, Sep. 2016, 15 pgs.

Peter de Rivaz et al., "AV1 Bitstream & Decoding Process Specification", Version 1.0.0 with Errata 1, The Alliance for Open Media, Jan. 2019, 681 pgs.

* cited by examiner

Figure 1:
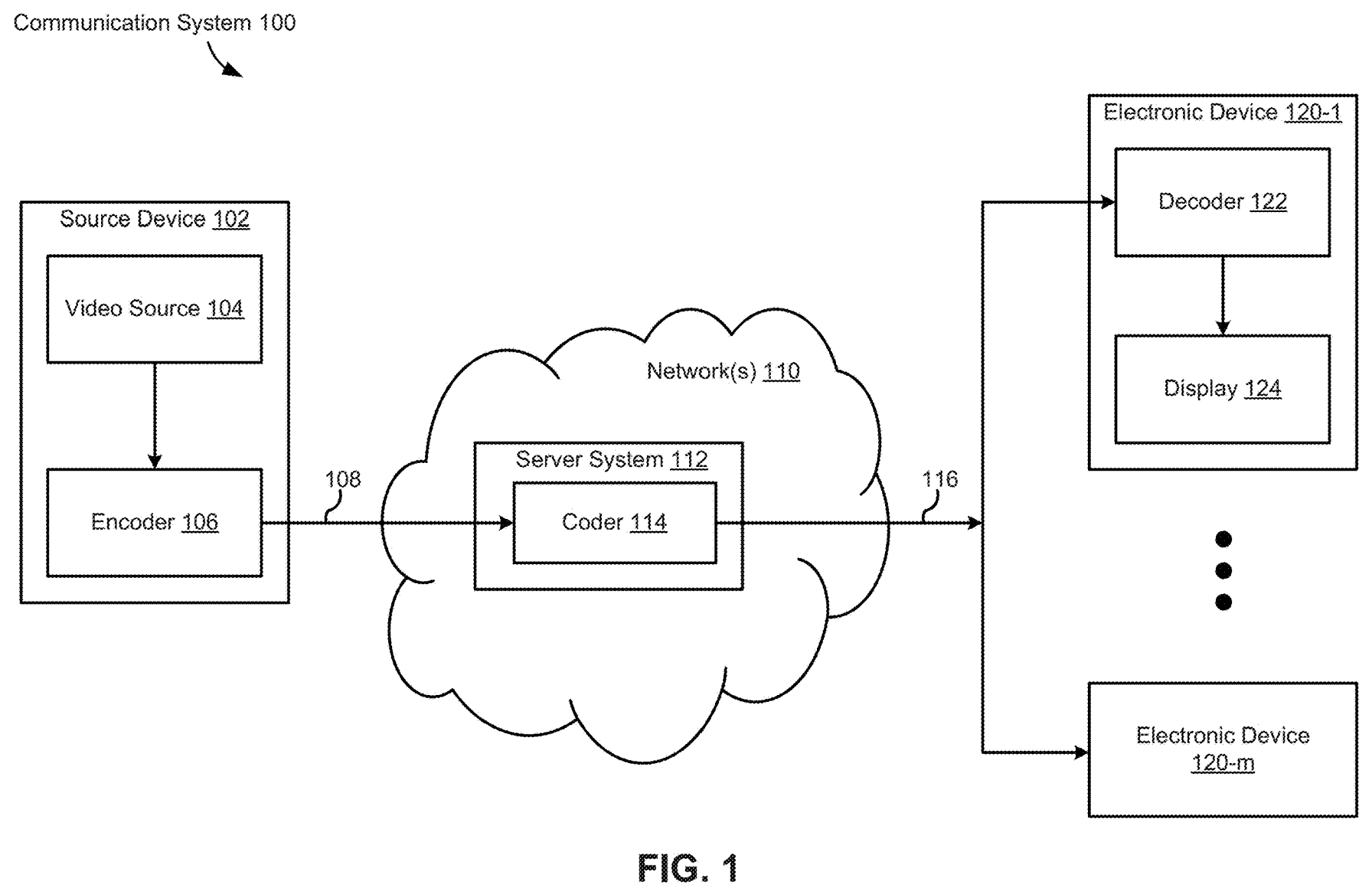

Communication System 100

Electronic Device 120-1

Decoder 122

Display 124

Electronic Device 120-m

116

Network(s) 110

Server System 112

Coder 114

108

Source Device 102

Video Source 104

Encoder 106

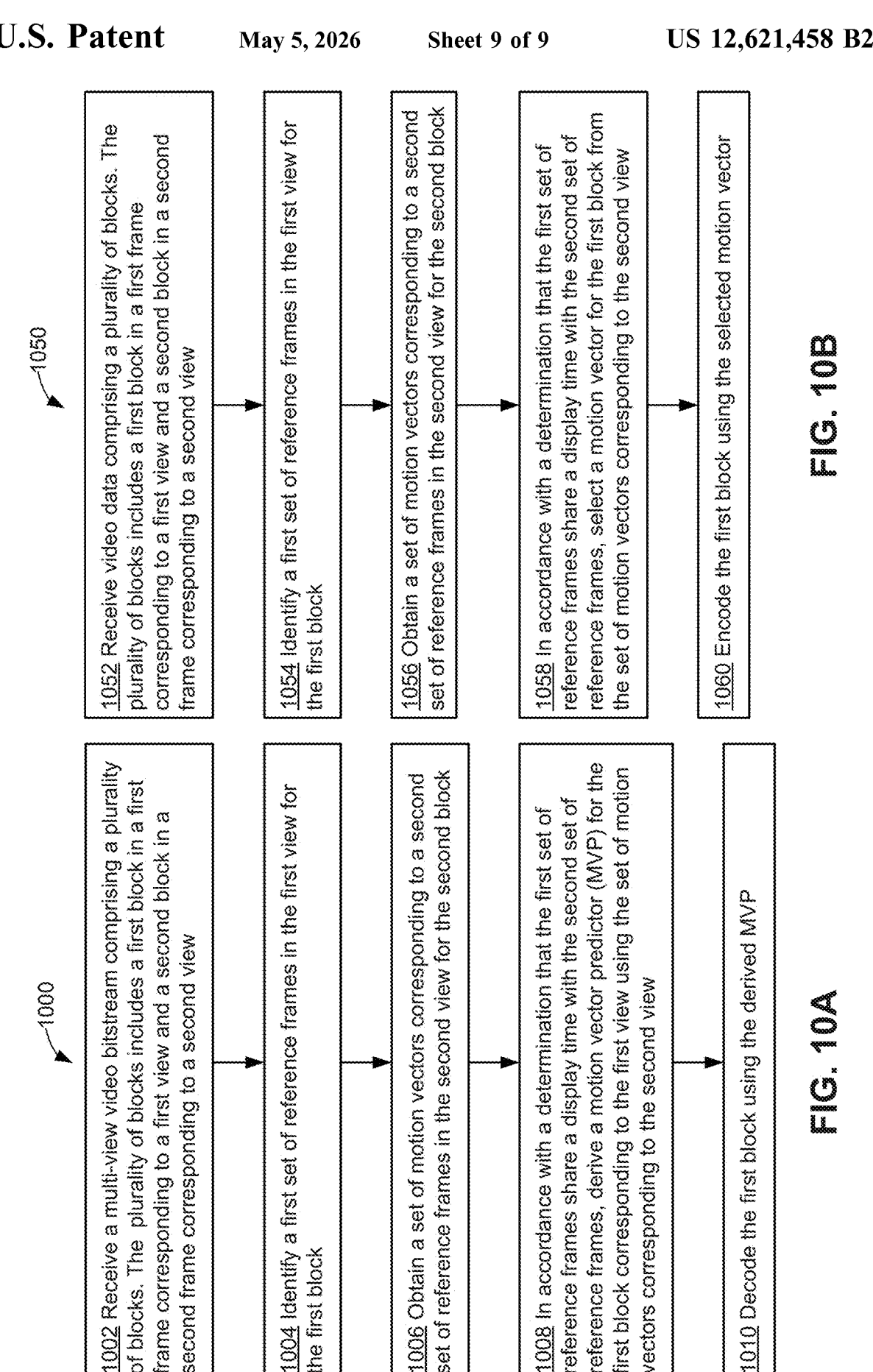

1050

1052 Receive video data comprising a plurality of blocks. The plurality of blocks includes a first block in a first frame corresponding to a first view and a second block in a second frame corresponding to a second view 1054 Identify a first set of reference frames in the first view for the first block 1056 Obtain a set of motion vectors corresponding to a second set of reference frames in the second view for the second block 1058 In accordance with a determination that the first set of reference frames share a display time with the second set of reference frames, select a motion vector for the first block from the set of motion vectors corresponding to the second view 1060 Encode the first block using the selected motion vector

1002 Receive a multi-view video bitstream comprising a plurality of blocks. The plurality of blocks includes a first block in a first frame corresponding to a first view and a second block in a second frame corresponding to a second view 1004 Identify a first set of reference frames in the first view for the first block 1006 Obtain a set of motion vectors corresponding to a second set of reference frames in the second view for the second block 1008 In accordance with a determination that the first set of reference frames share a display time with the second set of reference frames, derive a motion vector predictor (MVP) for the first block corresponding to the first view using the set of motion vectors corresponding to the second view 1010 Decode the first block using the derived MVP

FIG. 10A

SYSTEMS AND METHODS FOR CROSS-VIEW MOTION VECTOR PREDICTION

RELATED APPLICATIONS

This application claims priority to U.S. Provisional Patent Application No. 63/548,368, entitled "Cross-View Motion Vector Prediction," filed Nov. 13, 2023, which is hereby incorporated by reference in its entirety.

TECHNICAL FIELD

The disclosed embodiments relate generally to video coding, including but not limited to systems and methods for motion vector prediction for multiview video (MVV) coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes a set of methods for video (image) compression, specifically related to motion vector prediction when multiple views of a scene are being coded. In some embodiments, instead of coding each view and sending bitstreams from each view independently (simulcast coding), a disparity-compensated prediction approach is implemented whereby pictures of other views are included at the same time instance in the reference picture list. This approach, also known as disparity-compensated prediction, can improve coding efficiency by reducing statistical redundancy that exist between different views. In some instances, the approaches disclosed herein can achieve about 70% bitrate savings over simulcast coding.

In accordance with some embodiments, a method of video decoding includes (i) receiving a multi-view video bitstream comprising a plurality of blocks, including a first block in a first frame corresponding to a first view and a second block in a second frame corresponding to a second view; (ii) identifying a first set of reference frames in the first view for the first block; (iii) obtaining a set of motion vectors corresponding to a second set of reference frames in the second view for the second block; (iv) in accordance with a determination that the first set of reference frames share a display time with the second set of reference frames, deriving a motion vector predictor (MVP) for the first block corresponding to the first view using the set of motion vectors corresponding to the second view; and (v) decoding the first block using the derived MVP.

In accordance with some embodiments, a method of video encoding includes (i) receiving video data comprising a plurality of blocks, wherein the plurality of blocks includes a first block in a first frame corresponding to a first view and a second block in a second frame corresponding to a second view; (ii) identifying a first set of reference frames in the first view for the first block; (iii) obtaining a set of motion vectors corresponding to a second set of reference frames in the second view for the second block; (iv) in accordance with a determination that the first set of reference frames share a display time with the second set of reference frames, selecting a motion vector for the first block from the set of motion vectors corresponding to the second view; and (v) encoding the first block using the selected motion vector.

In accordance with some embodiments, a method of bitstream conversion includes (i) obtaining a source video sequence corresponding to a set of views; and (ii) performing a conversion between the source video sequence and a multi-view video bitstream of visual media data, where the multi-view video bitstream comprises (a) a first plurality of encoded pictures corresponding to a first view; (b) a second plurality of encoded pictures corresponding to a second view; and (c) an indicator that indicates whether one or more blocks from the first plurality of encoded pictures are encoded using motion vector information from the second plurality of encoded pictures.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 10A illustrates an example video decoding process in accordance with some embodiments.

FIG. 10B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
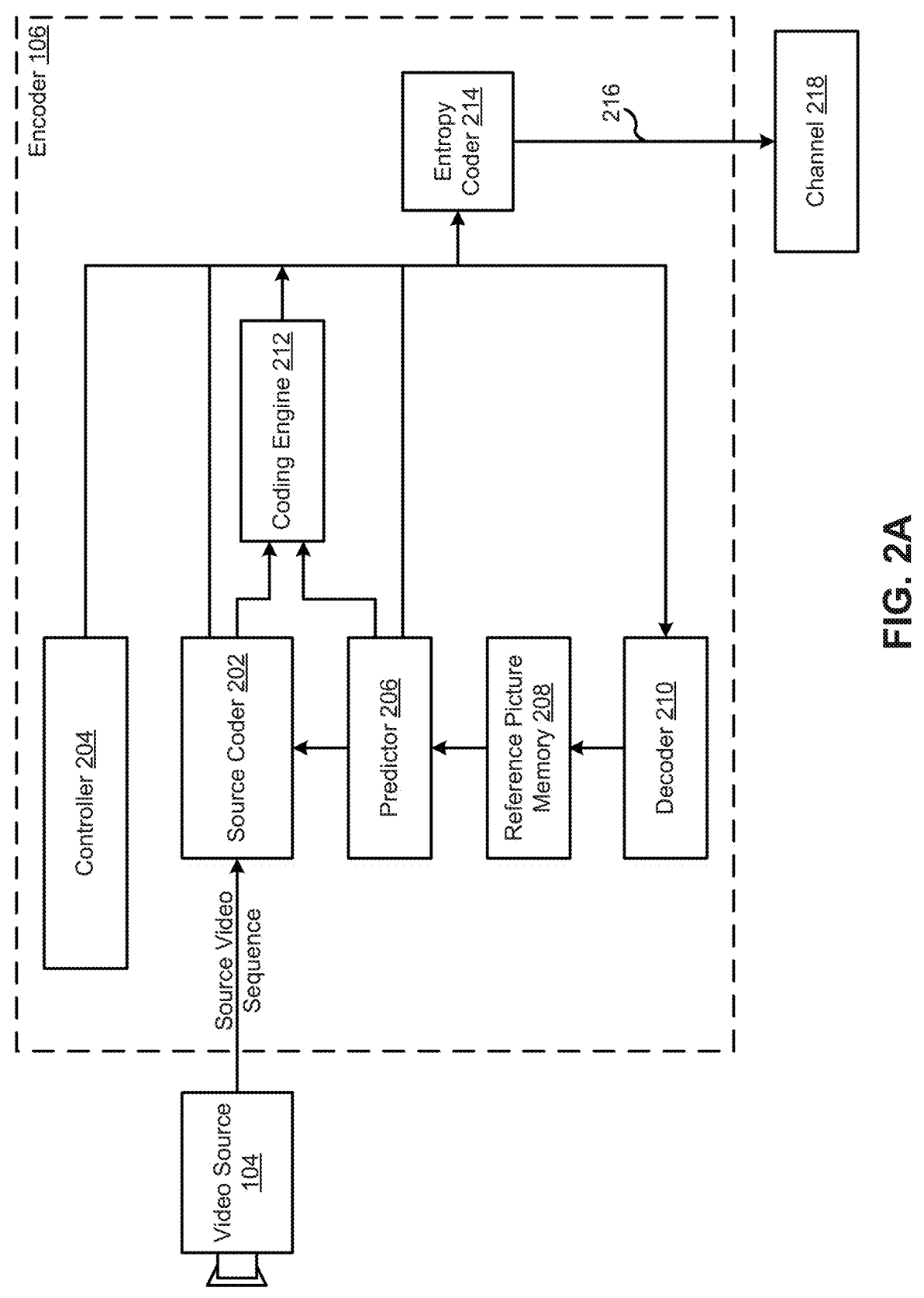
FIG. 2A is a block diagram illustrating example elements of an encoder component in accordance with some embodiments.

The present disclosure describes video/image compression techniques including motion vector prediction techniques for MVV coding. The disclosed techniques include deriving a motion vector predictor (MVP) for a first block corresponding to a first view using a set of motion vectors corresponding to a second view when it is determined that a first set of reference frames in the first view for the first block share a display time with a second set of reference frames in the second view of a second block first view, and decoding the first block using the derived MVP. By deriving MVPs for the first view using motion vectors for the second view, inter-view redundancies are reduced, and coding efficiency may be increased. Additionally, using motion vectors from the second view to derive the MVPs for the first view can improve MVP accuracy, which thereby improves video decoding accuracy (e.g., improves reconstruction quality).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
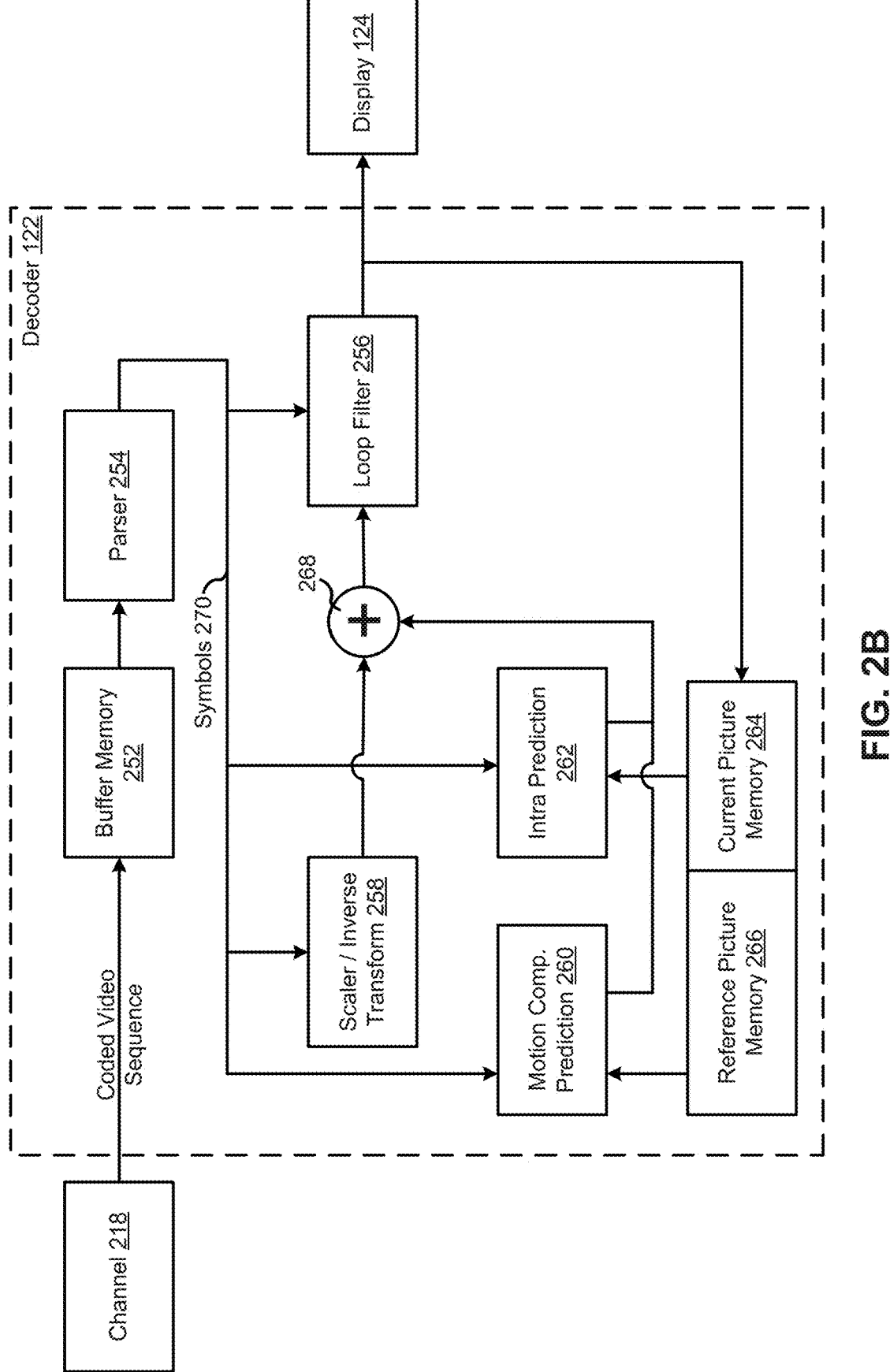
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other.

However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
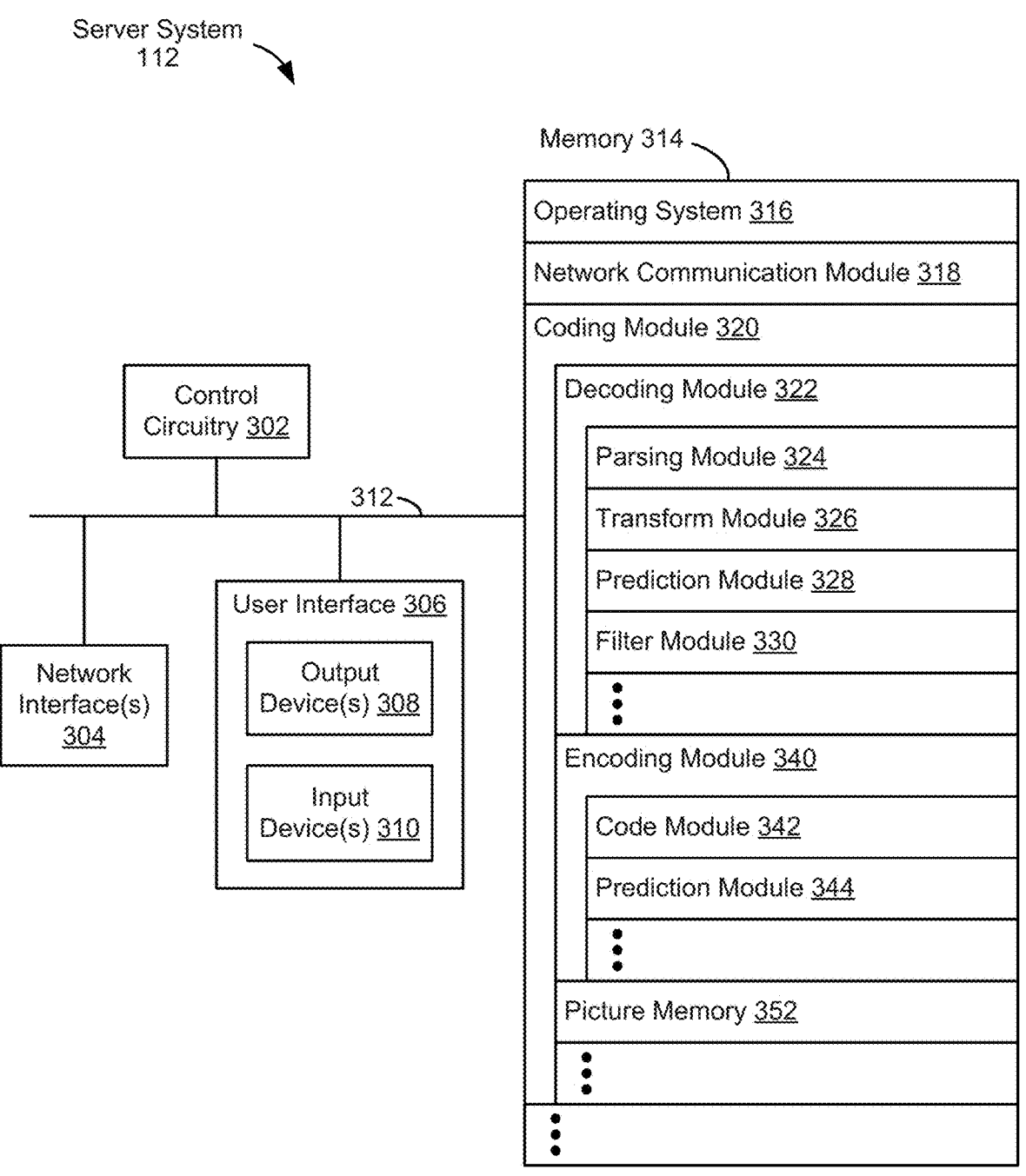
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120).

In the following, an inter-coded block can be coded using one or more associated motion vectors (MVs). The MVs are predicted using a dedicated motion vector predictor (MVP), and the difference between the current motion vector and its corresponding predictor may be signaled in the bitstream. The MVP is identified by an index that corresponds to one entry in a constructed motion vector prediction list. The list is constructed based on motion vectors from spatial neighbors or temporal neighbors. Spatial neighbors can include blocks that are directly adjacent to the current block, as well as blocks that are near but not directly adjacent to the current block. Temporal MV predictors (TMVP) can be derived using collocated blocks in reference frames. One way of generating temporal MVPs is to store the MVs of reference frames with reference indices associated with the respective reference frames, then the MVs of a reference frame whose trajectories pass through each 8×8 block of current frame are identified and stored with the reference frame index in a temporal MV buffer. Thereafter, given predefined block coordinates, the associated MVs stored in the temporal MV buffer are identified and projected onto the current block to derive a temporal MV predictor that points from the current block to its reference frame.

In the following, the term "mode 1" refers to a coding mode that inherits neighboring block motion vectors. The term "mode 2" refers to a coding mode that signals motion vector difference relative to a motion vector predictor selected from a spatially or temporally neighboring block or one given derived motion vector (such as global motion vector).

In the following, a motion vector bank is a group of motion vectors that are derived from coded blocks. Motion vectors the bank can be used as a MVP of the current block In MMV, different views can have strong correlation and reducing the statistical redundancy that exist between different views is helpful in improving coding efficiency. As described in detail below, some MMV techniques utilize block partitioning information of a first block in a first picture of a first view to perform block partitioning and coding of a second block in a second picture of a second view. The first block and the second block may be located at the same coordinates in the first view and the second view, respectively, and the first picture and the second picture may be associated with the same display time.

Figure 4:
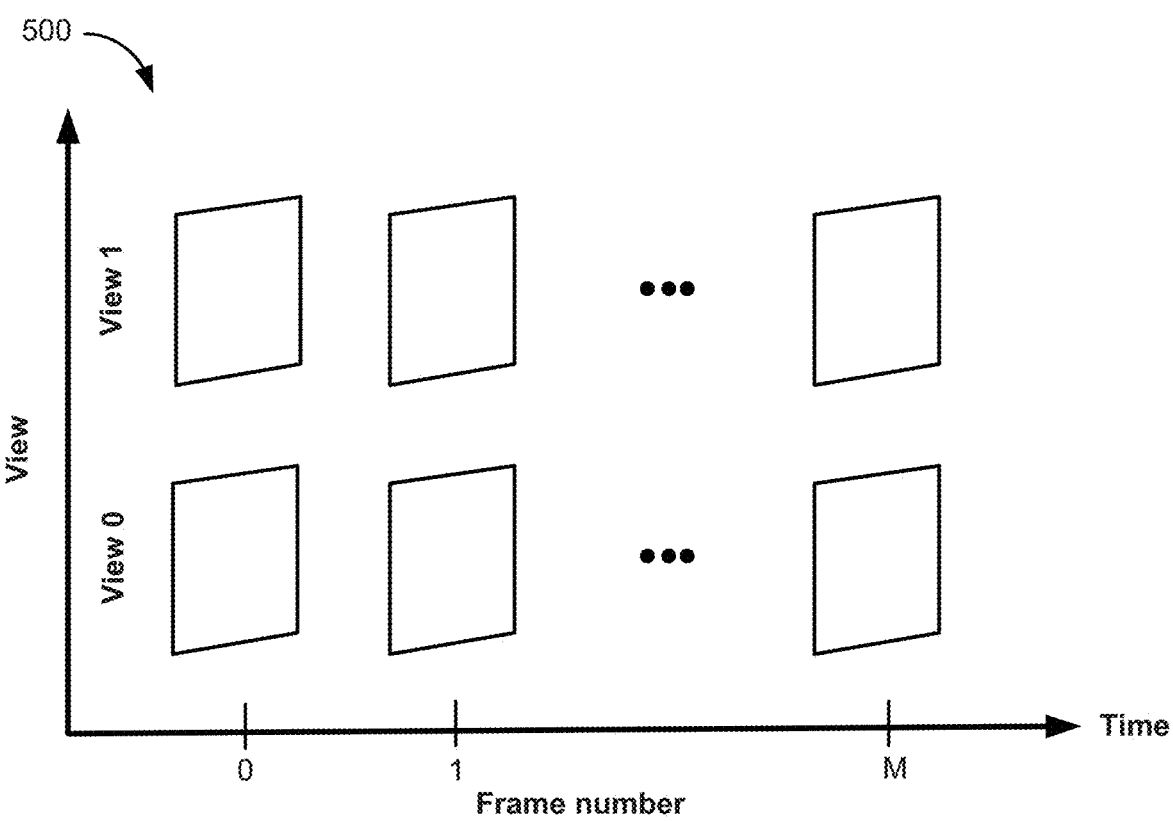
FIG. 4 illustrates an example MVV according to some embodiments.

FIG. 4 illustrates an example MVV 500 with two views (e.g., View 0 and View 1) according to some embodiments. Each view may be associated with a different viewport or camera. For applications such as stereo video viewing, videos of more than one view may be coded. In some embodiments, the MVV 500 corresponds to a 3D scene captured by two or more cameras. In some instances, optional processing, such as rectification and color correction of the views, is performed on the sender side. After encoding the MVV sequences, the bitstream is transmitted to the receiver-side, where the views are decoded and presented on a suitable 3D display. In some embodiments, a MVV includes more than two views.

Figure 5:
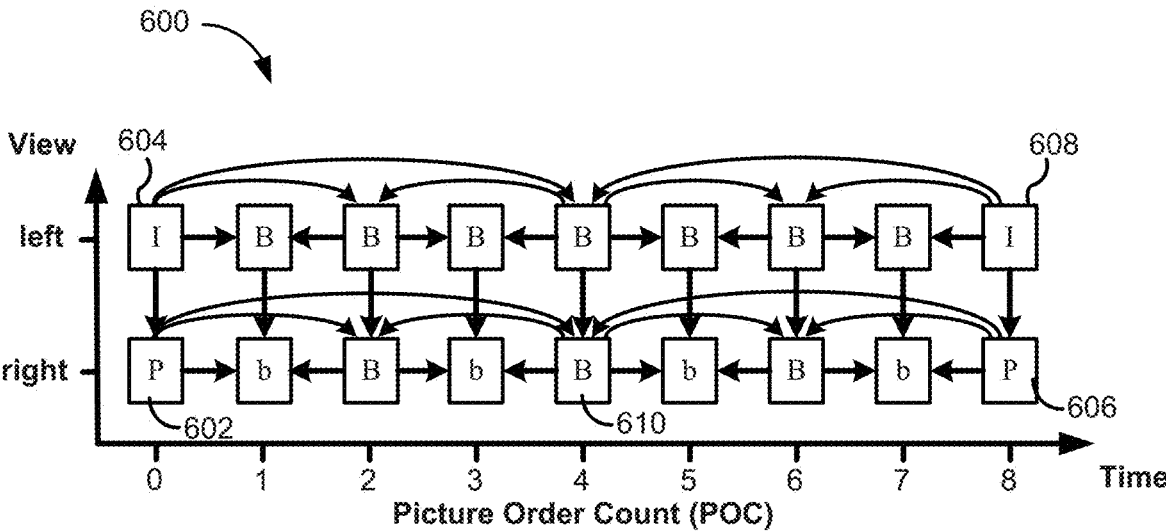
FIGS. 5-7 illustrate example operations in a MVV according to some embodiments.
Figures 6, 7:
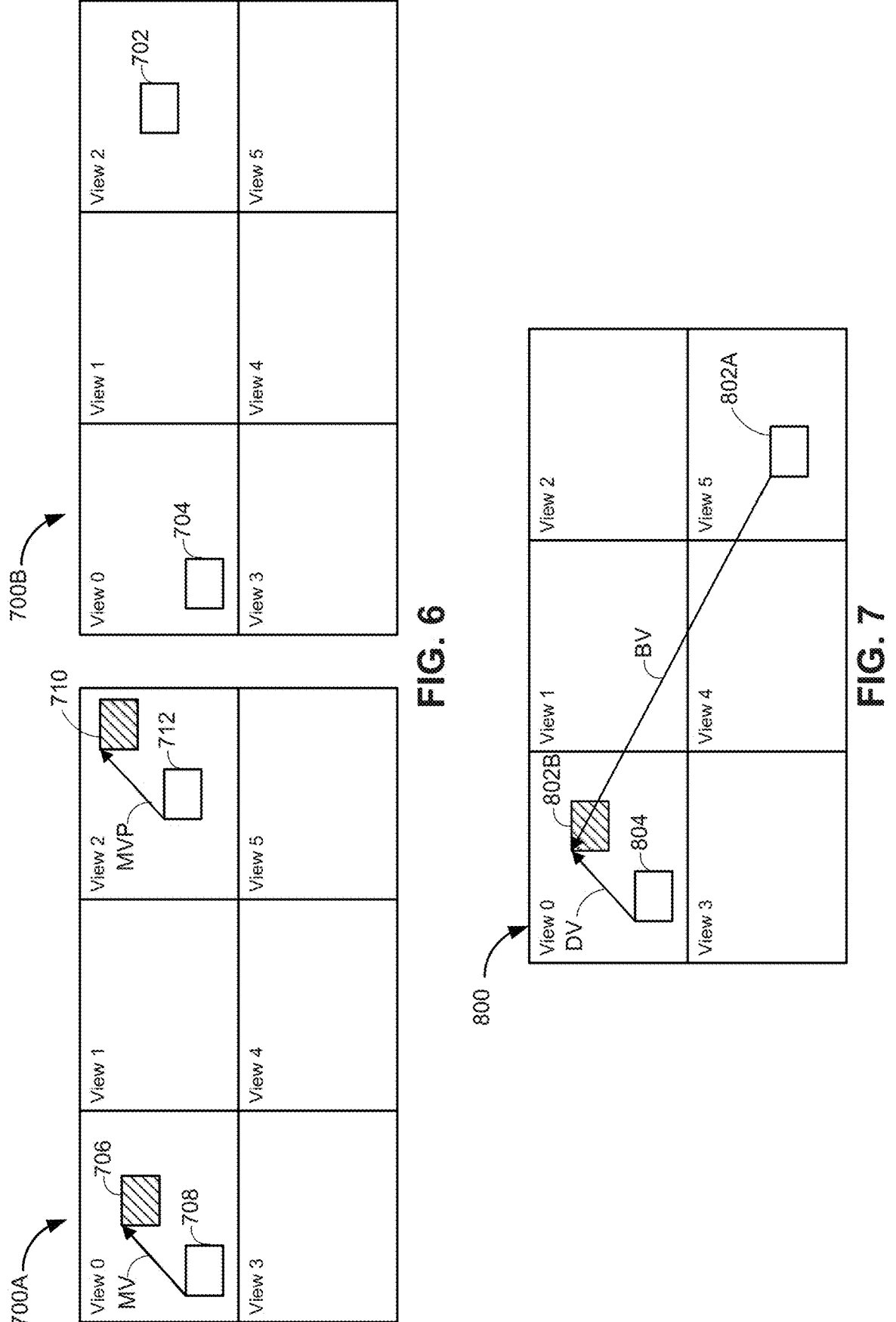

FIG. 5 illustrates an example prediction structure 600 for a MVV according to some embodiments. The structure 600 uses temporal reference pictures (represented by horizontal and curvy arrows) and inter-view reference pictures (represented by vertical arrows) for motion- and disparity-compensated prediction. FIG. 6 shows two sequences of pictures, corresponding to the left and right views, where the pictures in the left view are used to predict pictures in the right view due to the strong correlation between the two views, thus improving coding efficiency. Picture 602 in the right view (POC 0) is a P picture/frame that is coded (e.g., predicted) using picture 604 in the left view as a reference picture. The picture 604 is an I picture. The next frame that is coded in the right view is picture 606 (POC 8), corresponding to the last P frame in the sequence. Picture 602 and picture 606 are then used to derive picture 610 (POC 4) in the right view. The picture 610 is a bidirectional B picture/frame. The obtained POC 0, POC 8, and POC 4 in the right view are then used to derive POC2 and POC 6 in the right view. In some embodiments, the pictures in the right view are in multiple layers. For example, the odd-numbered POCs in the right view (denoted by lowercase "b") are in a different layer from the even-numbered POCs.

FIG. 6 illustrates video data 700A and 700B that each includes multiple views (e.g., View 0 through View 5) spatially stitched together to form a two-dimensional image. Although FIG. 7 depicts six views in the video data, it will be appreciated that any number of views may be stitched together. There can be several ways of spatially stitching the views. For example, for six views, one, two, or three views may be stitched per row, which may yield a 1×6 stitching, a 2×3 stitching, and 3×2 stitching, respectively. In some embodiments, the stitching is designed such that the resulting super-sized picture has a desirable picture size. For example, the super-sized picture can be close to a square shape or have a rectangle shape with a 4:3 aspect ratio or a 16:9 aspect ratio.

For a P slice or B slice in a super-sized picture, the motion vector from previous coded views in the same picture is highly correlated to the one in the current view under coding. Thus, the motion vector from previous coded views in the same pictures are well-suited for motion vector prediction or as the starting point in motion estimation for the current view. Further, in some embodiments, with the perspective transform between two views (e.g., from a reference view to a current view), a motion vector predictor (MVP) may be calculated. In some embodiments, an MVP candidate is derived for a current block 702 in the current view (Vcur) (e.g., View 2) of the current picture (Pcur). In some embodiments, the block 702 maps to a block 704 in the reference view (Vref) of Pcur. If the motion vector for block 704 is (Mx, My), with its reference block 706 residing in the same view (Vref) of a reference picture (Pref), one may yield $X_2=X_3+Mx$, and $Y_2=Y_3+My$, where $(X_2, Y_2)$ are the coordinates of the reference block 706, $(X_3, Y_3)$ are the coordinates of block 708, where block 708 is a co-located block of block 704. Both block 708 and block 704 may be in the reference view Vref (e.g., View 0), and block 708 may reside in Pref.

In FIG. 6, block 710 is the reference block of block 702, block 712 is a co-located block of block 702, and block 712 may reside in Vcur of Pref. In some embodiments, the coordinates of block 710 is derived based on the coordinates of block 712 and a computed (e.g., derived) MVP candidate for block 702.

In some embodiments, a disparity vector DV (Dx, Dy) is used to find the current block's co-located block in the same picture in the reference view, assuming samples in the block share the same disparity. In some embodiments, a location offset is established between the current view and its reference view (e.g., the offset can be twice the view width in x direction and 0 in y direction). The disparity vector can be added to the view offset to find the co-located block in the reference view for the current block. Since the co-located block indicated by the disparity vector in the reference view (e.g., view 0) may have been coded, its motion vector (if one exists) may point to a reference block in view 0 of the reference picture. In some embodiments, the reference block is used as a reference block for the current block (in view 2), or serves as a starting point in motion estimation.

FIG. 7 illustrates video data 800 with multiple views according to some embodiments. The video data 800 include several views (e.g., View 0 through View 5) spatially stitched together to form a two-dimensional image. The block vector (BV) may point to a reference block in previous coded views. In some embodiments, prior to block matching, a perspective transform is estimated between two views (e.g., View 0 and View 5). The perspective transform may set up a bijective mapping between the two views. The perspective transform may be applied to the reference view (e.g., View 0), which maps coordinates from the reference view to the current view under coding (e.g., View 5). The "transformed" reference view may be used as reference for conducting block matching.

For a block (e.g., block 808A) in the current view, the block's co-located block (e.g., block 804) may be found in the same position (e.g., same coordinates) in the "transformed" reference view, and starts with the co-located block as a starting point for block matching (e.g., with block 802B). As the perspective transform approximates closely the transition between two views, the block matching may be limited to a small neighborhood of the co-located block in the "transformed" reference view. In some embodiments, the current block and its co-located block have the same location offset relative to the top-left position of their corresponding views. The perspective transform can be estimated by analyzing the reference view and the current view. The perspective transform can also be derived using techniques from computational photography, such as key point detection and matching, or calculated directly from camera parameters and depth map data.

In some embodiments, a disparity vector DV (Dx, Dy) is used to indicate the disparity between the co-located block in the reference view and the reference block in the reference view, assuming samples in the block share the same disparity. Note that for each view pair, the block vector (BV) may be different for blocks in different locations of a view. The block vector pointing from the current block to its reference block in a reference view consists of two parts: the view location offset plus the disparity vector.

Figure 8A:
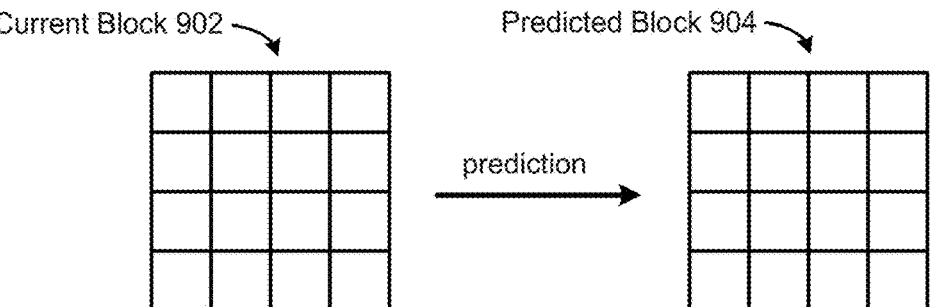
FIGS. 8A-8C illustrate example prediction blocks, residue blocks, and reconstructed blocks according to some embodiments.
Figure 8B:
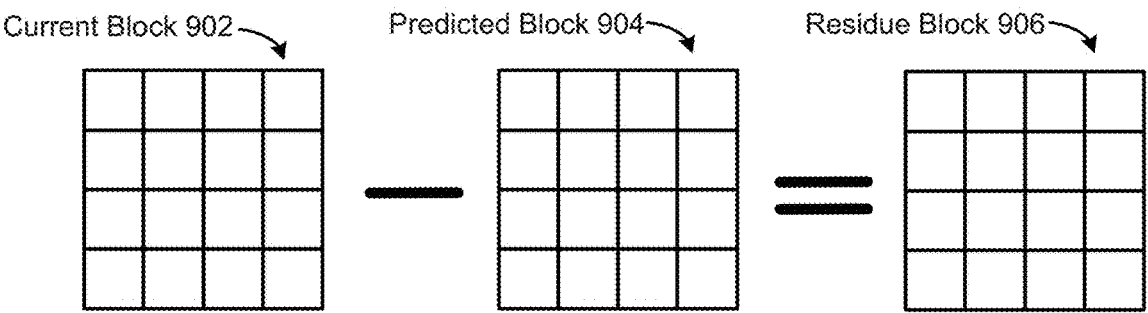
Figure 8C:
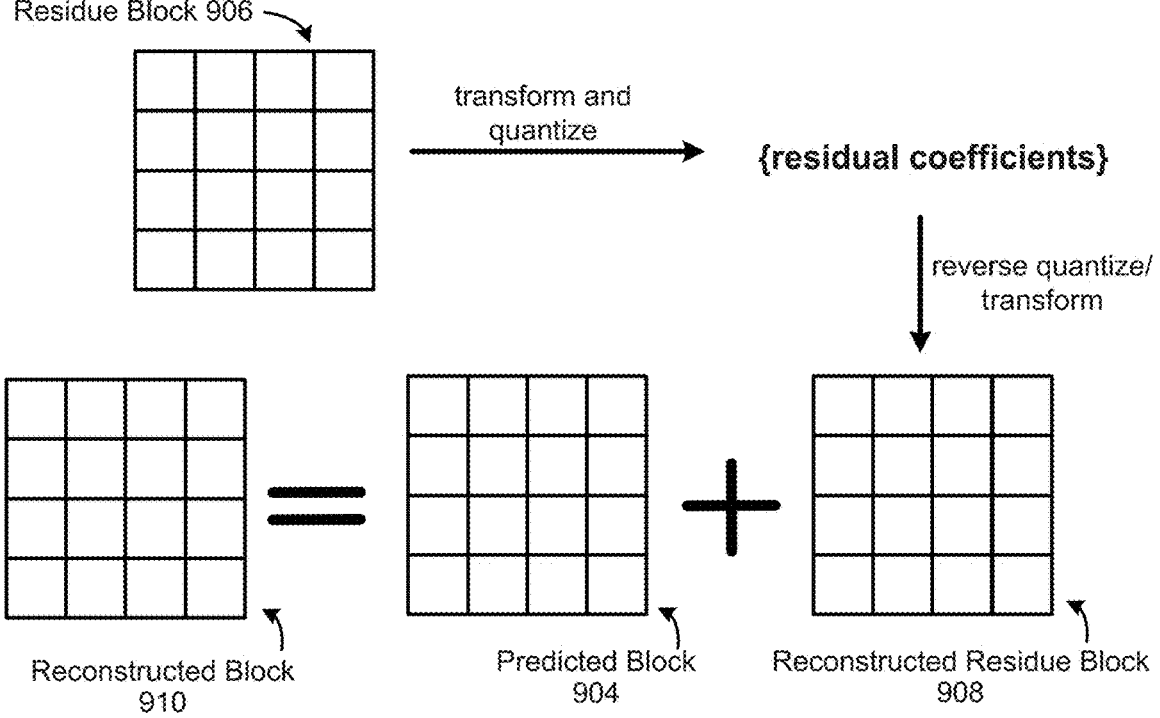

FIGS. 8A-8C illustrate an example encoding and subsequent decoding process for a current block. FIG. 8A illustrates the computation of a prediction block in accordance with some embodiments. In the example of FIG. 8A, an intra prediction is performed on a current block 902 to generate a predicted block 904. In some embodiments, an inter prediction is performed to generate the predicted block. The current block 902 includes a set of samples (e.g., pixel blocks) and the prediction block 904 includes a set of predictions that correspond to the set of samples. FIG. 8B illustrates the computation of a residue block in accordance with some embodiments. As shown in FIG. 8B, the prediction block 904 is subtracted from the current block 902 to generate a residue block 906 that includes a set of residues. For example, respective differences are calculated between each sample and the corresponding prediction. FIG. 8C illustrates the computation of a reconstructed block in accordance with some embodiments. As shown in FIG. 8C, the residue block 906 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residue block 908. The reconstructed residue block 908 is combined with the predicted block 904 (e.g., reconstructed residues of the reconstructed residue block 908 are added to predictions of the prediction block 904) to generate a reconstructed block 910 corresponding to the current block 902.

Figure 9:
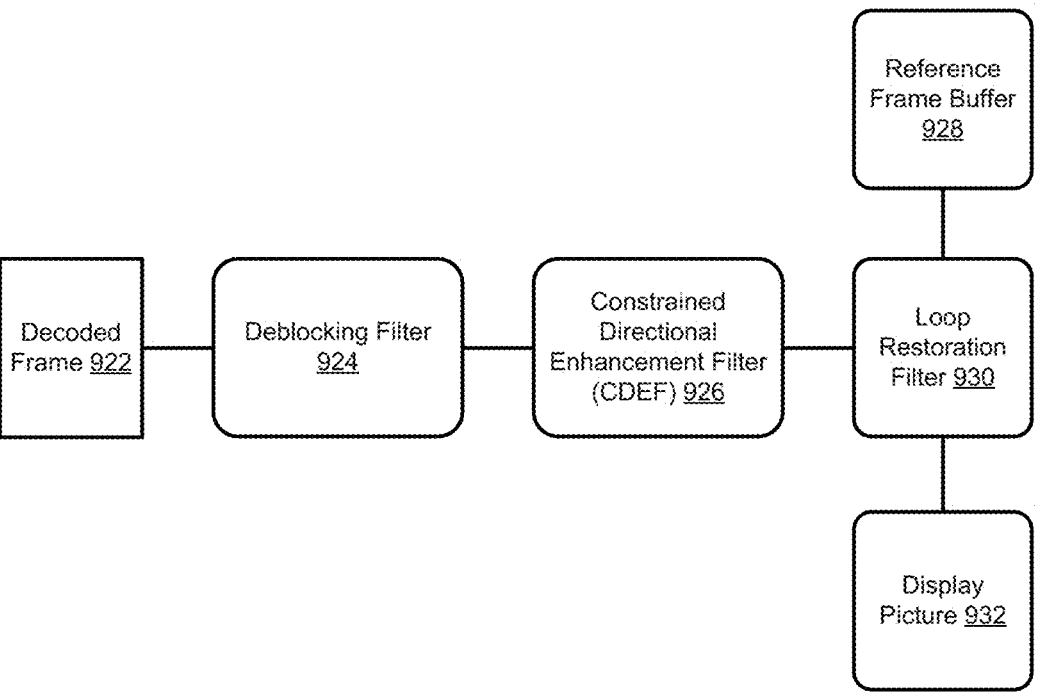
FIG. 9 illustrates example in-loop filtering stages according to some embodiments.

FIG. 9 illustrates example in-loop filtering stages according to some embodiments. In FIG. 9, the in-loop filtering stages applied to a decoded frame 922 include a deblocking filter 924, a constrained direction enhancement filter (CDEF) 926, and a loop restoration filter 930. In some embodiments, the filtered output frame is used as a reference frame for later frames (e.g., stored in a reference frame buffer 928). The loop filtering methods may include any filtering process applied on the reconstructed samples (e.g., after adding residual to the prediction), including wiener loop filtering, cross-component filtering, and CDEF. In some instances, the reconstructed sample filtered by loop filtering can be used as a reference sample for performing prediction within a picture. In some instances, the reconstructed sample filtered by loop filtering cannot be used as a reference sample.

A cross-component filtering method may use a co-located reconstructed sample and neighboring reconstructed samples from a first color component as input, to perform filtering of the current reconstruction sample of a second color component. A cross-component offset filtering method may use the co-located reconstructed sample and its neighboring reconstructed samples from a first color component as input, to derive an offset value that is added on the current sample of a second color component to adjust its reconstruction value. The first color component may refer to a luma color component, and the second color component may refer to a chroma color component. The first color component and second color component may be the same color component (e.g., a luma component).

The deblocking filter 924 may be applied across the transform block boundaries to remove block artifacts caused by the quantization error. In some embodiments, a filter length is determined based on the minimum transform block sizes on both sides. In some embodiments, finite impulse response (FIR) filters (e.g., low-pass filters) are used by the deblocking filter 924. Edge detection may be used to disable the deblocking filter at transitions that contain a high variance signal (e.g., to avoid blurring an actual edge in the original image). In this way, a deblocking filtering method may be applied on reconstructions samples located close to block boundaries. The block boundaries may include a transform block boundary, a motion compensation block boundary, a coding block boundary, and/or a fixed block size boundary.

The CDEF 926 applies a non-linear de-ringing filter along particular (e.g., oblique) directions. The CDEF 926 may operate on an output of the deblocking filter 924. The CDEF 926 may operate in 8×8 units. In some embodiments, 8 preset directions are defined by rotating and reflecting templates of preset directions. The decoder may use the reconstructed pixels to select the prevalent direction index. A primary filter may be applied along the selected direction, and a secondary filter may be applied along an offset direction (e.g., oriented 45° off the primary direction). In some embodiments, up to 8 groups of filter parameters are signaled (e.g., in a frame header). The groups of filter parameters may include the primary and secondary filter strength indexes of luma and chroma components. The CDEF 926 may apply filtering on reconstruction samples by identifying the direction of each block and then adaptively filtering with a high degree of control over the filter strength along the direction and across it.

In some embodiments, the loop restoration filter 930 is applied to reconstructed pixels after any prior in-loop filtering stages (e.g., the deblocking filter 924 and/or the CDEF 926). The loop restoration filter 930 may be applied to loop restoration units (LRU), e.g., 64×64, 128×128, and/or 256×256 pixel blocks. Bypass filtering, a wiener filter (e.g., a wiener loop filtering method), and/or a self-guided filter may be applied to each LRU independently. A wiener loop filtering method may use a linear weighted sum of the current reconstruction sample and multiple spatially neighboring reconstruction samples as input to derive a modified value for the current reconstruction sample as the output.

FIG. 10A is a flow diagram illustrating a method 1000 of decoding video in accordance with some embodiments. The method 1000 may be performed at a computing system (e.g., the server system 112, the source device 102, or the electronic device 120) having control circuitry and memory storing instructions for execution by the control circuitry. In some embodiments, the method 1000 is performed by executing instructions stored in the memory (e.g., the memory 314) of the computing system.

The system receives (1002) a multi-view video bitstream comprising a plurality of blocks, including a first block in a first frame corresponding to a first view and a second block in a second frame corresponding to a second view. The system identifies (1004) a first set of reference frames in the first view for the first block. The system obtains (1006) a set of motion vectors corresponding to a second set of reference frames in the second view for the second block. The system, in accordance with a determination that the first set of reference frames share a display time with the second set of reference frames, derives (1008) a MVP for the first block corresponding to the first view using the set of motion vectors corresponding to the second view. The system decodes (1010) the first block using the derived MVP. For example, motion vector(s) that are derived from coded information associated with another view are used to derive the MVP for a block in a current view. In some embodiments, the motion vector associated with a first coding block of a first picture in a first view, namely a view-based motion vector predictor (VMVP), is used as the MVP for a second coding block of a second picture in a second view. In some embodiments, the first coding block is fetched using a disparity vector that is derived by neighboring blocks that are coded using the second view as reference frame. In one example, the disparity vector is (0, 0), meaning the first coding block and the second coding block are located at the same coordinate in the first view and the second view, respectively. In another example, the disparity vector is derived by a global disparity vector that is associated with the combination between the two frames displayed at the same time from different views.

In some embodiments, the first coding block is coded using reference frame(s) that belong to the first view. The display times of the reference frame(s) of the first view are compared to display times of the reference frames for the second block in the second view. If the display times are the same, then the motion vectors associated with the first coding block are used as the motion vector predictor of the second coding block. In some embodiments, the first coding block is coded using reference frames that belong to the first view. The display times of the reference frames are different from display times of the reference frames for the second block in the second view. The motion vectors associated with the first coding block are scaled and used as the motion vector predictor of the second coding block.

In some instances, the scaling factor is proportional to the ratio between the temporal distance between the first picture and its reference frames in the first view and the temporal distance between the second picture and its reference frames in the second view.

In some embodiments, an MVP for the current block is constructed. The checking order of TMVP or VMVP candidate relative to other motion vector predictor candidates (e.g., spatial motion vector predictor candidates, global motion vector predictor candidates, motion vector predictor candidates in the motion vector bank) is different. In come embodiments, the TMVP and VMVP are both in the motion vector list. Each is associated with different index in the motion vector list. In some embodiments, the motion vector list has a pre-defined fixed (maximum) number of TMVP and/or VMVP. The TMVP/VMCP candidates in the list depends on the checking order and availability of the TMVP and VMVP candidates. In an example, two lists, namely a MVP list from multi-view and a list from the current frame, are constructed. A high-level flag or block level flag is signaled to indicate which list is used.

In some embodiments, more than one motion vector fetched from multiple coding blocks in the first picture of the first view is employed as the MVP candidates for the second block in the second picture of the second view. The fetched motion vectors can be added to the MVP list and used as the MVP for the second block.

In some embodiments, the coding blocks are from non-adjacent coding blocks relative to a first coding block of a first picture in a first view. In some embodiments, the first coding block is determined using a disparity vector that is derived by neighboring blocks of the second block that are coded using the second view as reference frame. In some embodiments, the disparity vector is (0, 0), e.g., the first coding block and the second coding block are located at the same coordinates in the first view and the second view, respectively.

In some embodiments, the disparity vector is derived by a global disparity vector that is associated with the combination between the two frames displayed at the same time from different views.

In some embodiments, if the motion vector of spatial (or temporal) neighboring block(s) is pointing to the first view, then the motion vector of the neighboring blocks is also inserted into the MVP list of the current block. In some embodiments, for the current block, an additional motion vector is explicitly signaled or implicitly derived and is used to indicate the position displacement in the reference picture of the second view. In some embodiments, the coordinates of the coding blocks are predefined, or implicitly derived using coded information such as block shape, quantization parameters, and/or temporal layers.

In some embodiments, the motion vector bank associated with a block in the first picture of the first view is used to derive a motion vector predictor for a block in the second picture of the second view. In some embodiments, the motion vector bank associated with a block in the first picture of the first view is merged with the motion vector bank associated with a block in the second picture of the second view.

In some embodiments, the usage or enabling of the above embodiments are controlled by high-level syntax, including but not limited to sequence-level, picture-level, subpicture-level, slice-level, tile-level, largest coding block-level flags.

In some embodiments, a block partitioning mode is signaled jointly for multiple blocks that belong to different views. In some embodiments, the blocks are co-located blocks (e.g., blocks located at the same coordinates in different views). In some embodiments, the locations of the blocks depend on the disparity of the views. In some instances, the disparity between the views is quantized to certain predefined values. The values can be powers of 2 (or 4), such as 4, 8, 16.

In some embodiments, a flag is signaled for blocks from different views to indicate whether the partitioning mode of the blocks is signaled jointly or separately. In some embodiments, the flag is conditionally signaled. For example, the flag is signaled when the block is greater than (or less than) a pre-defined threshold value (e.g., 128×128, 64×64, 32×32, 16×16, or 8×8). In some embodiments, when the partitioning mode of the blocks is signaled jointly, the number of signaled syntaxes related to partitioning modes is less than the number of blocks. For example, if N blocks (where N>1) are sharing the same partitioning mode, the partitioning mode is signaled once instead of N times (for the N blocks). In some embodiments, when the partitioning mode of the blocks is signaled jointly, the partitioning mode of the blocks is shared for a given first depth value, and the partitioning modes of these blocks are signaled separately beyond the first depth value.

In some embodiments, when the block partitioning modes are signaled for multiple blocks from different views, the prediction mode of the blocks (e.g., intra prediction or inter prediction, and their directions) is also signaled jointly. For example, the partitioning modes can specify how the block is partitioned into smaller block sizes. The partitioning mode can also specify whether different color components are sharing the same partitioning.

In some embodiments, the block partitioning mode of the first block from the first view is used to derive the context for signaling the partitioning mode of the second block from the second view. The context provides a better estimate of probability of bits having a certain value, which in turn improves coding efficiency. In some embodiments, the same context is shared for coding the same type of syntax for different views. For example, when coding the block partitioning mode, the contexts related to signaling the block partitioning mode for the first view may be further updated by the signaling of the block partitioning mode for the second view, and vice versa.

In some embodiments, instead of coding different pictures from different views separately, the signaling of syntaxes is interleaved. For example, syntaxes that belong the second view may be signaled between multiples syntaxes that are signaled for the first view. In some embodiments, the signaling of largest coding units (LCU) for different views are interleaved. An example coding order can be LCU0 of View 0, LCU0 of View 1, LCU1 of View 0, and LCU 1 of View 1. An advantage of interleaving the signaling of largest coding units (LCU) is potentially more efficient context update.

In some embodiments, only partial syntaxes are signaled in an interleaved way for different views; partial syntaxes are still signaled separately for different views without interleaving. In some embodiments, syntaxes related to block partitioning are signaled separately for different views; other syntaxes are signaled in an interleaved way for different views. In some embodiments, syntaxes related to loop filtering are signaled separately for different views; other syntaxes are signaled in an interleaved way for different views. In some embodiments, the interleaving of syntax signaling is performed in different units, including such as the tile, slice, largest coding unit, row of largest coding unit, coding block, transform block, prediction block, or pre-defined block size. In some embodiments, the interleaving of syntax signaling is conditionally performed (e.g., when the first and second pictures are same type (e.g., intra- or inter picture).

In some embodiments, loop filtering parameters associated with one or more loop filtering methods are signaled jointly for multiple pictures from different views. Example loop filtering methods include cross-component filtering, cross-component offset filtering, wiener loop filtering, deblocking filtering, and CDEF methods. In some embodiments, a high-level syntax is signaled to indicate whether the loop filtering parameters are signaled jointly for multiple pictures from different views, or separately for multiple pictures from different views. In some embodiments, the high-level syntax used for signaling the enabling of loop filtering method(s) are signaled jointly for multiple views.

In some embodiments, picture level on/off flags for loop filtering method(s) are signaled jointly for multiple views. In some embodiments, the picture level on/off flags for a loop filtering method in one view is signaled depending on the picture level on/off flag of the loop filtering method for another view. In one example, for a first picture in a first view, three flags can be signaled for different color components to specify whether a first loop filtering method is applied on three color components separately. Then, for a second view, a flag is signaled to indicate whether the values of the three flags are inherited for a second picture in a second view. In another example, for a first picture in a first view, multiple flags are signaled separately to specify whether each of multiple loop filtering methods is enabled. Then, for a second picture in a second view, one flag is signaled whether the enabling of multiple loop filtering methods are inherited from the first picture in the first view, or signaled separately for the second picture in the second view.

In some embodiments, the parameters used in one loop filtering method are signaled jointly for multiple views. In some embodiments, parameters for the cross-component offset filtering method are signaled jointly for multiple views. The parameters can include an offset look-up table, selection between band only offset, edge only offset and band-edge combination offset, the filtering shape, the quantization step size, downsampling filter, and the filtering unit size. In some embodiments, loop filtering parameters for the wiener loop filtering method are signaled jointly for multiple views. The parameters can include filtering parameters, selection of a filtering shape and/or size, and/or filtering unit size. In some embodiments, loop filtering parameters for CDEF are signaled jointly for multiple views.

In some embodiments, a flag is signaled to indicate whether loop filtering parameter(s) are shared from a first picture in the first view to the second picture in the second view. In some embodiments, a flag is signaled to indicate whether loop filtering parameter(s) are predicted from a first picture in the first view to the second picture in the second view. In some embodiments, residuals of the prediction on the loop filtering parameter(s) are signaled for the second picture in the second view.

In some embodiments, partial parameters of one loop filter are shared for both views, whereas remaining parameters are signaled jointly, dependently, or independently for both views. For example, the on/off flag for both views is signaled individually, whereas the parameter sets that controls the loop filters are signaled independently for both views.

Some embodiments apply loop filtering on the reconstruction of a first picture from a first view, using the reconstructed picture of a second picture from a second view as one of the inputs to the loop filtering process (e.g., cross-view loop filtering). In some embodiments, the input of the loop filter includes the reconstruction of a first picture in the first view, and the output comprises an offset to be added on top of the reconstruction of the second picture in the second view. In some embodiments, the input of the original loop filtering method used in a single view is also used together as the input to the loop filtering method.

In some embodiments, the first component of the reconstruction of a first picture in the first view is used as the input to the loop filtering of a second component of the reconstruction of a second picture in a second view. The first and second components can be different components. In some embodiments, the input from a second view are samples around the co-located sample of the sample in a first view to be filtered. In some embodiments, the input from a second view are samples located by a disparity vector.

In some embodiments, the disparity vector is derived from the disparity vectors associated with neighboring blocks that are using a different view as the reference picture, e.g., inter-view prediction. In some embodiments, the precision of the disparity vector comprises a pre-defined precision, e.g., integer-pel, half-pel, or quarter-pel.

In some embodiments, the filtering order of pictures from different views is different from the coding order of pictures from different views. For example, for residual coding, a first picture from a first view is coded first, followed by the residual coding of a second picture from a second view. Loop filtering on the reconstruction of the second picture is performed before the loop filtering on the reconstruction of the first picture.

In some embodiments, the reconstructed samples from both views are jointly used as the input of the loop filters for the individual view. For example, reconstructed samples from both views are used to derive the filter parameters for each individual view.

FIG. 10B is a flow diagram illustrating a method 1050 of encoding video in accordance with some embodiments. The method 1050 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (1052) video data comprising a plurality of blocks, including a first block in a first frame corresponding to a first view and a second block in a second frame corresponding to a second view. The system identifies (1054) a first set of reference frames in the first view for the first block. The system obtains (1056) a set of motion vectors corresponding to a second set of reference frames in the second view for the second block. The system, in accordance with a determination that the first set of reference frames share a display time with the second set of reference frames, selects (1058) a motion vector for the first block from the set of motion vectors corresponding to the second view. The system encodes (1060) the first block using the selected motion vector. As described previously, the encoding process may mirror the decoding processes described herein (e.g., motion vector derivation and identification). For brevity, those details are not repeated here.

Although FIGS. 10A and 10B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In one aspect, some embodiments include a method (e.g., the method 1000) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a multi-view video bitstream comprising a plurality of blocks, including a first block in a first frame corresponding to a first view and a second block in a second frame corresponding to a second view; (ii) identifying a first set of reference frames in the first view for the first block; (iii) obtaining a set of motion vectors corresponding to a second set of reference frames in the second view for the second block; (iv) in accordance with a determination that the first set of reference frames share a display time with the second set of reference frames, deriving a motion vector predictor (MVP) for the first block corresponding to the first view using the set of motion vectors corresponding to the second view; and (v) decoding the first block using the derived MVP. For example, the motion vector(s) that are derived from the coded information associated with another view are used to derive the MVP for a block in the current view. As an example, the motion vector associated with a first coding block of a first picture in a first view, namely view-based motion vector predictor (VMVP), is used as the MVP for the second coding block of a second picture in a second view. As an example, if the first coding block is coded using reference frames that belongs to the first view, then the display times of these reference frames are compared to the display times of the reference frames for the second block in the second view, if the display times are the same, then the motion vectors associated with the first coding block can be used as the MVP of the second coding block. In some embodiments, in accordance with a determination that the first set of reference frames do not share a display time with the second set of reference frames, a MVP for the first block is derived without using the set of motion vectors corresponding to the second view.

(A2) In some embodiments of A1, the second block is identified using a disparity vector, wherein the disparity vector is derived from a set of neighboring blocks that are coded using the first view as a reference frame. For example, a first coding block is determined (e.g., fetched) using a disparity vector that is derived by neighboring blocks that are coded using the second view as reference frame. As an example, the disparity vector may always be (0, 0), that is, the first coding block and the second coding block are located at the same coordinate in the first view and the second view, respectively. In another example, the disparity vector is derived by a global disparity vector that is associated with the combination between the two frames displayed at the same time from different views. In some embodiments, the global disparity vector represents a difference in perspective between the first view and the second view. In some embodiments, the global disparity vector is derived based on relative positioning of a first camera corresponding to the first view and a second camera corresponding to the second view.

(A3) In some embodiments of A1 or A2, the method includes, when the first set of reference frames do not share the display time with the second set of reference frames, deriving the MVP for the first block corresponding to the first view using scaled information from the set of motion vectors corresponding to the second view. For example, if the first coding block is coded using reference frames that belong to the first view, and the display times of these reference frames are different from the display times of the reference frames for the second block in the second view, then the motion vectors associated with the first coding block are scaled and used as the MVP of the second coding block.

(A4) In some embodiments of A3, the set of motion vectors are scaled accordingly to a scaling factor that is proportional to a ratio of temporal distances. For example, the scaling factor is proportional to the ratio between the temporal distance between the first picture and its reference frames in the first view and the temporal distance between the second picture and its reference frames in the second view.

(A5) In some embodiments of any of A1-A4, the method includes constructing a MVP list corresponding to the first block, wherein the MVP list includes a TMVP candidate and/or a VMVP candidate. For example, when constructing the MVP list for the current block, the checking order of TMVP or VMVP candidate relative to other MVP candidates (e.g., spatial MVP candidates, global MVP candidates, MVP candidates in the motion vector bank) is different.

(A6) In some embodiments of A5, the MVP list includes the TMVP candidate at a first index and the VMVP candidate at a second index. For example, the TMVP and VMVP can both stay in the motion vector list, each associated with different index in the motion vector list.

(A7) In some embodiments of A5 or A6, the MVP list is restricted from having more than a predefined number of TMVP and/or VMVP candidates. For example, only a predefined fixed (maximum) number of TMVP and/or VMVP can stay in the motion vector list, and which TMVP/

VMCP candidates can stay in the motion vector list depends on the checking order and availability of the TMVP and VMCP candidates.

(A8) In some embodiments of any of A5-A7, the MVP list includes one or more motion vectors corresponding to the second view. For example, more than one motion vectors fetched from multiple coding blocks in the first picture of the first view can be employed as the MVP candidates for the second block in the second picture of the second view, and these fetched motion vectors can be added to the MVP list and used as the MVP for the second block.

(A9) In some embodiments of any of A1-A8, the method includes constructing a first MVP list corresponding to multiple views and constructing a second MVP list corresponding to a current frame, where the MVP for the first block is derived using the first MVP list or the second MVP list in accordance with a signaled indicator in the multi-view video bitstream. For example, an MVP list from multi-view and a list from the current frame are constructed, and a high-level flag or block level flag is signaled to indicate which list is used.

(A10) In some embodiments of any of A1-A9, the MVP for the first block is derived using motion vectors corresponding to a plurality of blocks in the second frame corresponding to the second view. For example, the plurality of blocks (e.g., multiple coding blocks) may be from non-adjacent coding blocks relative to a first coding block of a first picture in a first view.

(A11) In some embodiments of A10, coordinates for the plurality of blocks in the second frame are predefined or derived by the computing system. For example, the coordinates of the multiple coding blocks can be predefined, or they can be implicitly derived using coded information, including but not limited to the block shape, quantization parameters, temporal layers.

(A12) In some embodiments of any of A1-A11, the method further includes obtaining an additional motion vector for the first block, the additional motion vector indicating a position displacement for the second set of reference frames. For example, for the current block, an additional motion vector can be explicated signaled or implicated derived. This motion vector is used to indicate the position displacement in the reference picture of the second view.

(A13) In some embodiments of any of A1-A12, the MVP for the first block is derived based on a motion vector bank associated with the second block. For example, the motion vector bank associated with a block in the first picture of the first view can be used to derive a MVP for a block in the second picture of the second view. In some embodiments, the motion vector bank associated with a block in the first picture of the first view is merged with the motion vector bank associated with a block in the second picture of the second view.

(A14) In some embodiments of any of A1-A13, the MVP for the first block corresponding to the first view is derived using the set of motion vectors corresponding to the second view in accordance with a first indicator in the multi-view video bitstream indicating that motion vectors from different views are to be used for the first block. For example, the first indicator is signaled in high level syntax.

(B1) In another aspect, some embodiments include a method (e.g., the method 1050) of video encoding. In some embodiments, the method is performed at a computing system having memory and one or more processors. The method includes: (i) receiving video data comprising a plurality of blocks, including a first block in a first frame corresponding to a first view and a second block in a second frame corresponding to a second view; (ii) identifying a first set of reference frames in the first view for the first block; (iii) obtaining a set of motion vectors corresponding to a second set of reference frames in the second view for the second block; (iv) in accordance with a determination that the first set of reference frames share a display time with the second set of reference frames, selecting a motion vector for the first block from the set of motion vectors corresponding to the second view; and (v) encoding the first block using the selected motion vector.

(B2) In some embodiments of B1, the method further includes identifying the second block using a disparity vector, where the set of motion vectors are obtained in accordance with identifying the second block.

(B3) In some embodiments of B1 or B2, the method further includes in accordance with a determination that the first set of reference frames do not share the display time with the second set of reference frames, deriving the motion vector for the first block using scaled information from the set of motion vectors corresponding to the second view.

(B4) In some embodiments of any of B1-B3, the set of motion vectors correspond to a plurality of blocks in the second view, the plurality of blocks including the second block.

(C1) In another aspect, some embodiments include a method of visual media data processing. In some embodiments, the method is performed at a computing system having memory and one or more processors. The method includes: (i) obtaining a source video sequence corresponding to a set of views; and (ii) performing a conversion between the source video sequence and a multi-view video bitstream of visual media data, wherein the multi-view video bitstream comprises: (a) a first plurality of encoded pictures corresponding to a first view; (b) a second plurality of encoded pictures corresponding to a second view; and (c) an indicator that indicates whether one or more blocks from the first plurality of encoded pictures are encoded using motion vector information from the second plurality of encoded pictures.

(C2) In some embodiments of C1, the indicator is signaled in high level syntax of the multi-view video bitstream.

(D1) In another aspect, some embodiments include a method of video decoding. In some embodiments, the method is performed at a computing system having memory and one or more processors. The method includes: (i) receiving a multi-view video bitstream comprising a plurality of blocks, including a first block in a first frame corresponding to a first view and a second block in a second frame corresponding to a second view; (ii) obtaining a motion vector predictor (MVP) list for the first block, the MVP list comprising at least one MVP corresponding to the second view; (iii) identifying, from the MVP list, an MVP for the first block; and (iv) decoding the first block using the identified MVP. In some embodiments, the method further includes any of the previously described motion vector identified and/or derivation techniques.

(E1) In another aspect, some embodiments include a method of video decoding. In some embodiments, the method is performed at a computing system having memory and one or more processors. The method includes: (i) receiving a multi-view video bitstream comprising a plurality of blocks, including a first block in a first view and a second block in a second frame corresponding to a second view; (ii) identifying a motion vector bank corresponding to the second block; (iii) deriving an MVP for the first block corresponding to the first view using the motion vector bank corresponding to the second block; and (iv) decoding the first block using the derived MVP. In some embodiments, the method further includes any of the previously described motion vector identified and/or derivation techniques.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A14, B1-B4, C1-C2, D1, and E1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A14, B1-B4, C1-C2, D1, and E1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
    receiving a multi-view video bitstream comprising a plurality of blocks, wherein the plurality of blocks includes a first block in a first frame corresponding to a first view and a second block in a second frame corresponding to a second view;
    identifying a first set of reference frames in the first view for the first block;
    obtaining a set of motion vectors corresponding to a second set of reference frames in the second view for the second block;
    when the first set of reference frames share a display time with the second set of reference frames, deriving a motion vector predictor (MVP) for the first block corresponding to the first view using the set of motion vectors corresponding to the second view;
    when the first set of reference frames do not share the display time with the second set of reference frames, deriving the MVP for the first block corresponding to the first view using scaled information from the set of motion vectors corresponding to the second view; and
    decoding the first block using the derived MVP.

2. The method of claim 1, wherein the second block is identified using a disparity vector, wherein the disparity vector is derived from a set of neighboring blocks that are coded using the first view as a reference frame.

3. The method of claim 1, wherein the set of motion vectors are scaled accordingly to a scaling factor that is proportional to a ratio of temporal distances.

4. The method of claim 1, further comprising constructing a MVP list corresponding to the first block, wherein the MVP list includes a temporal motion vector predictor (TMVP) candidate and/or a view-based motion vector predictor (VMVP) candidate.

5. The method of claim 4, wherein the MVP list includes the TMVP candidate at a first index and the VMVP candidate at a second index.

6. The method of claim 4, wherein the MVP list is restricted from having more than a predefined number of TMVP and/or VMVP candidates.

7. The method of claim 4, wherein the MVP list includes one or more motion vectors corresponding to the second view.

8. The method of claim 1, further comprising:
    constructing a first MVP list corresponding to multiple views; and
    constructing a second MVP list corresponding to a current frame
    wherein the MVP for the first block is derived using the first MVP list or the second MVP list in accordance with a signaled indicator in the multi-view video bitstream.

9. The method of claim 1, wherein the MVP for the first block is derived using motion vectors corresponding to a plurality of blocks in the second frame corresponding to the second view.

10. The method of claim 9, wherein coordinates for the plurality of blocks in the second frame are predefined or derived by the computing system.

11. The method of claim 1, further comprising obtaining an additional motion vector for the first block, the additional motion vector indicating a position displacement for the second set of reference frames.

12. The method of claim 1, wherein the MVP for the first block is derived based on a motion vector bank associated with the second block.

13. The method of claim 1, wherein the MVP for the first block corresponding to the first view is derived using the set of motion vectors corresponding to the second view in accordance with a first indicator in the multi-view video bitstream indicating that motion vectors from different views are to be used for the first block.

14. A computing system, comprising:
    control circuitry;
    memory; and
    one or more sets of instructions stored in the memory and configured for execution by the control circuitry, the one or more sets of instructions comprising instructions for:
        receiving video data comprising a plurality of blocks, wherein the plurality of blocks includes a first block in a first frame corresponding to a first view and a second block in a second frame corresponding to a second view;
        identifying a first set of reference frames in the first view for the first block;
        obtaining a set of motion vectors corresponding to a second set of reference frames in the second view for the second block;
        when the first set of reference frames share a display time with the second set of reference frames, selecting a motion vector for the first block from the set of motion vectors corresponding to the second view;
        when the first set of reference frames do not share the display time with the second set of reference frames, deriving the motion vector for the first block using scaled information from the set of motion vectors corresponding to the second view; and
        encoding the first block using the selected motion vector.

15. The computing system of claim 14, further comprising identifying the second block using a disparity vector, wherein the set of motion vectors are obtained in accordance with identifying the second block.

16. The computing system of claim 14, wherein the set of motion vectors correspond to a plurality of blocks in the second view, the plurality of blocks including the second block.

17. A method for generating a video bitstream, the method comprising obtaining a multi-view video bitstream, including: receiving video data comprising a plurality of blocks, wherein the plurality of blocks includes a first block in a first frame corresponding to a first view and a second block in a second frame corresponding to a second view; identifying a first set of reference frames in the first view for the first block; obtaining a set of motion vectors corresponding to a second set of reference frames in the second view for the second block; when the first set of reference frames share a display time with the second set of reference frames, selecting a motion vector for the first block from the set of motion vectors corresponding to the second view; when the first set of reference frames do not share the display time with the second set of reference frames, deriving the motion vector for the first block using scaled information from the set of motion vectors corresponding to the second view; encoding the first block using the selected motion vector; and transmitting the multi-view video bitstream.

18. The method of claim 17, wherein obtaining the multi-view video bitstream further comprises identifying the second block using a disparity vector, wherein the set of motion vectors are obtained in accordance with identifying the second block.

\* \* \* \* \*